US007275091B2

(12) United States Patent
Jystad et al.

(10) Patent No.: US 7,275,091 B2
(45) Date of Patent: Sep. 25, 2007

(54) CATALOGING RADIO STATIONS

(75) Inventors: Glenn E. Jystad, Dove Canyon, CA (US); Kim C. Smith, Dove Canyon, CA (US)

(73) Assignee: Gateway Inc., Irvine, CA (US)

( * ) Notice: Subject to any disclaimer, the term of this patent is extended or adjusted under 35 U.S.C. 154(b) by 744 days.

(21) Appl. No.: 10/151,565

(22) Filed: May 20, 2002

(65) Prior Publication Data
US 2003/0217102 A1   Nov. 20, 2003

(51) Int. Cl.
G06F 15/13 (2006.01)
(52) U.S. Cl. .................. 709/219; 709/203; 709/217; 705/1
(58) Field of Classification Search ............. 709/219, 709/203, 217; 705/1
See application file for complete search history.

(56) References Cited

U.S. PATENT DOCUMENTS

| 6,003,041 A | 12/1999 | Wugofski ................... 707/104 |
| 6,055,566 A | 4/2000 | Kikinis ........................ 709/219 |
| 6,175,362 B1 | 1/2001 | Harms et al. ................ 345/327 |
| 6,243,725 B1 | 6/2001 | Hempleman et al. ....... 707/530 |
| 6,269,377 B1 | 7/2001 | Collie et al. ................. 707/103 |
| 6,317,784 B1 * | 11/2001 | Mackintosh et al. ........ 709/219 |
| 6,865,600 B1 * | 3/2005 | Brydon et al. ............... 709/219 |
| 2001/0042109 A1 * | 11/2001 | Bolas et al. .................. 709/219 |
| 2002/0073171 A1 * | 6/2002 | McDowall et al. .......... 709/217 |
| 2002/0091761 A1 * | 7/2002 | Lambert ....................... 709/203 |
| 2002/0091848 A1 * | 7/2002 | Agresta et al. .............. 709/231 |
| 2002/0120752 A1 * | 8/2002 | Logan et al. ................ 709/228 |
| 2004/0019497 A1 * | 1/2004 | Volk et al. ....................... 705/1 |

* cited by examiner

Primary Examiner—Jinsong Hu
(74) Attorney, Agent, or Firm—Scott C. Richardson; McGrath, Geissler, Olds & Richardson

(57) ABSTRACT

A method, apparatus, and signal-bearing medium that presents a station list of sources of audio in a user interface from which the user may select. The station list may include attributes of the audio, such as a channel and description. The station list may be kept on a per-user basis, so that all users may have their own list. Further, the users may access and select audio to be played from their station list anywhere in a network, regardless of where the list was created.

26 Claims, 4 Drawing Sheets

CATALOGING RADIO STATIONS

CROSS REFERENCE TO RELATED APPLICATIONS

This application is related to application Ser. No. 10/142,074 filed, May 9, 2002, entitled "Cataloging Audio Content" and to application Ser. No. 10/126,905 filed, Apr. 19, 2002, entitled "Remote Access to Aggregated Grouping of Distributed Content".

FIELD

This invention relates generally to a network of electronic devices and more particularly to cataloging radio stations in a network of electronic devices.

BACKGROUND

Years ago, people listened to a local radio station on their radios. But today, computer users listen to radio stations and audios portals that broadcast over the Internet. Users also listen to music on compact discs in players attached to computers and to digital music files stored on computers. Thus, users must sort through large numbers of options to find the audio that they wish to play, which is cumbersome. Hence, there is a need for a solution that assists the user in finding and playing digital audio.

SUMMARY

A method, apparatus, and signal-bearing medium is provided that presents a station list of sources of audio in a user interface from which the user may select. The station list may include attributes of the audio, such as a channel and description. The station list may be kept on a per-user basis, so that all users may have their own list. Further, the users may access and select audio to be played from their station list anywhere in a network, regardless of where the list was created.

DETAILED DESCRIPTION

In the following detailed description of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Figure 1:
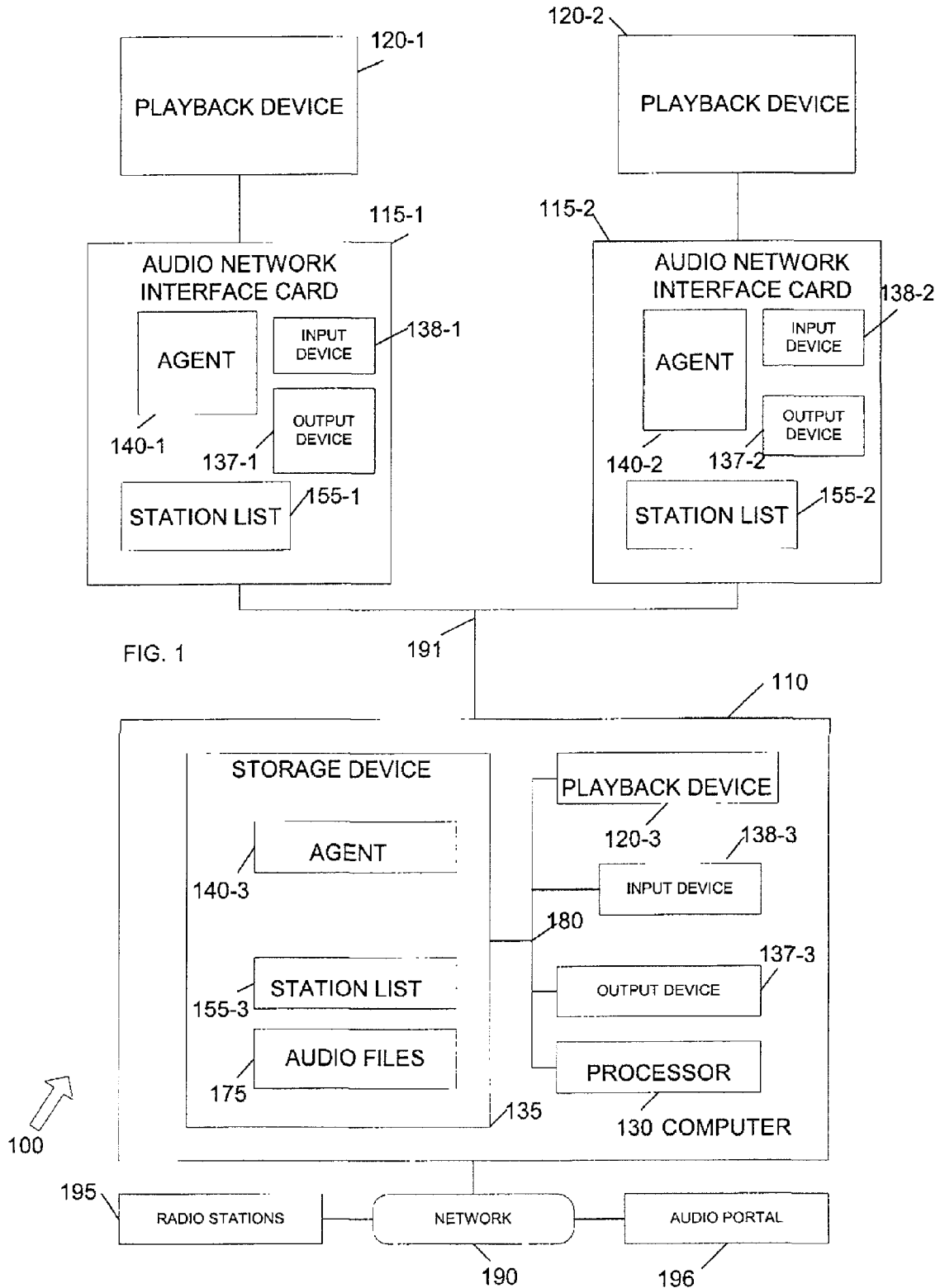
FIG. 1 depicts a block diagram of a system for implementing an embodiment of the invention.

FIG. 1 depicts a block diagram of a system 100 for implementing an embodiment of the invention. The system 100 may include a computer 110 connected to audio network interface cards 115-1 and 115-2 and a network 190. The computer 110 and the audio network interface cards 115-1 and 115-2 may be connected via a network 191. The audio network interface cards 115-1 and 115-2 may be connected to respective playback devices 120-1 and 120-2. The network 190 may be connected to radio stations 195 and an audio portal 196. Although one computer 110 is shown, in other embodiments any number of computers may be present. Although two audio network interface cards 115-1 and 115-2 are shown, in other embodiments any number of audio network interface cards may be present.

The computer 110 may include a playback device 120-3, a processor 130, a storage device 135, an output device 137-3, and an input device 138-3, all connected via a bus 180.

The playback device 120-3 may be a speaker, a stereo system, a boombox, or any other device capable of playing audio sounds. Although only one playback device 120-3 is shown in the computer 110, in another embodiment multiple playback devices may be present of the same type or different types. Although the playback device 120-3 is shown to be contained within the computer 110, in another embodiment the playback device 120-3 may be external to the computer 110.

The processor 130 may represent a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 130 may execute instructions and may include that portion of the computer 110 that controls the operation of the entire computer. Although not depicted in FIG. 1, the processor 130 typically includes a control unit that organizes data and program storage in memory and transfers data and other information between the various parts of the computer 110. The processor 130 may receive input data from the audio network interface cards 115-1 and 115-2 and the network 190, may read and store code and data in the storage device 135, may send data to the audio network interface cards 115-1 and 115-2, may send audio signals to the playback device 120-3, and may present data to the output device 137-3.

Although the computer 110 is shown to contain only a single processor 130 and a single bus 180, the present invention applies equally to computers that may have multiple processors and to computers that may have multiple buses with some or all performing different functions in different ways.

The storage device 135 represents one or more mechanisms for storing data. For example, the storage device 135 may include read only memory (ROM), random access memory (RAM), magnetic disk storage media, optical storage media, flash memory devices, and/or other machine-readable media. In other embodiments, any appropriate type of storage device may be used. Although only one storage device 135 is shown, multiple storage devices and multiple types of storage devices may be present. Further, although the computer 110 is drawn to contain the storage device 135, it may be distributed across other computers.

The storage device 135 may include an agent 140-3, a station list 155-3, and audio files 175. The agent 140-3 may include instructions capable of being executed on the processor 130 to carry out the functions of the present invention, as further described below with reference to FIG. 4. In another embodiment, some or all of the functions of the present invention may be carried out via hardware in lieu of a processor-based system. Of course, the storage device 135 may also contain additional software and data (not shown), which is not necessary to understanding the invention.

The station list 155-3 may include attributes describing sources of audio data. In an embodiment, the station list 155-3 may include user-selected channels, predefined channels, and playlists on a per-user basis. Thus, subsets of the station list 155-3 are associated with particular users. In other embodiments, the station list 155-3 may include any appropriate attributes of the audio. The station list 155-3 is further described below with respect to FIGS. 2, 3, and 4. Agent 140-3 may query the audio network interface cards 115-1 and 115-2 for data to incorporate into the station list 155-3. Agent 140-3 may also receive data to add to the station list 155-3 from the input device 138-3 and from the audio portal 196.

The audio files 175 may include a digital representation of audio content. In an embodiment the audio files 175 may include a digital representation of music, such as songs. But, in another embodiment, the audio files may contain a digital representation of any sounds. Although the audio files 175 are shown in computer 110, in another embodiment the audio files 175 may be accessed via the network 190 from the radio stations 195 and/or the audio portal 196.

The output device 137-3 is that part of the computer 110 that displays output to the user. The output device 137-3 may be a cathode-ray tube (CRT) based video display well known in the art of computer hardware. But, in other embodiments the output device 137-3 may be replaced with a liquid crystal display (LCD) based or gas, plasma-based, flat-panel display. In still other embodiments, any appropriate display device may be used. Although only one output device 137-3 is shown, in other embodiments, any number of output devices of different types or of the same type may be present. In another embodiment, the output device 137-3 may not be present.

The input device 138-3 may be a keyboard, mouse, trackball, touchpad, touchscreen, keypad, voice recognition device or any other appropriate mechanism for the user to input data to the computer 110. Although only one input device 138-3 is shown, in another embodiment any number of input devices may be present.

The bus 180 may represent one or more busses, e.g., PCI, ISA (Industry Standard Architecture), X-Bus, EISA (Extended Industry Standard Architecture), or any other appropriate bus and/or bridge (also called a bus controller).

The computer 110 may be implemented using any suitable hardware and/or software, such as a personal computer or other electronic computing device. Portable computers, laptop or notebook computers, PDAs (Personal Digital Assistants), two-way alphanumeric pagers, keypads, portable telephones, pocket computers, and mainframe computers are examples of other possible configurations of the computer 110. The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted. Thus, an embodiment of the invention may apply to any hardware configuration that supports playing audio in a network.

The audio network interface card 115-1 may be an electronic device capable of receiving a digital stream of audio content and decoding that stream into an analog output compatible with a standard stereo system input. The audio network interface card 115-1 may include an output device 137-1, an input device 138-1, an agent 140-1, and a station list 155-1.

The output device 137-1 may be analogous to the output device 137-3, as previously described above. In another embodiment, the output device 137-1 may not be present.

The input device 138-1 may be analogous to the input device 138-3, as previously described above. In another embodiment, the input device 138-1 may not be present.

The agent 140-1 may be analogous to the agent 140-3, as previously described above. The station list 155-1 may include attributes describing sources of audio data, as further described below with respect to FIGS. 2, 3, and 4. The agent 140-1 may query the audio network interface card 115-2 and the computer 110 for attributes of sources of audio data and may incorporate their respective attributes into the station list 155-1.

The audio network interface card 115-2 may be analogous to the audio network interface card 115-1, as previously described above, and may include an output device 137-2, an input device 138-2, an agent 140-2, and a station list 155-2.

The output device 137-2 may be analogous to the output device 137-1. The input device 138-2 may be analogous to the input device 138-1. The agent 140-2 may be analogous to the agent 140-1. The station list 155-2 may be analogous to the station list 155-1.

The playback devices 120-1 and 120-2 may be analogous to the playback device 120-3. Although audio network interface cards 115-1 and 115-2 are shown to be separate from their respective playback devices 120-1 and 120-2, in another embodiment they may be integrated together.

The network 190 may be any suitable network and may support any appropriate protocol suitable for communication to the computer 110. In an embodiment, the network 190 may support wireless communications. In another embodiment, the network 190 may support hard-wired communications, such as a telephone line or cable. In another embodiment, the network 190 may support the Ethernet IEEE 802.3x specification. In another embodiment, the network 190 may be the Internet and may support IP (Internet Protocol). In another embodiment, the network 190 may be a local area network (LAN) or a wide area network (WAN). In another embodiment, the network 190 may be a hotspot service provider network. In another embodiment, the network 190 may be an intranet. In another embodiment, the network 190 may be a GPRS (General Packet Radio Service) network. In another embodiment, the network 190 may be any appropriate cellular data network or cell-based radio network technology. In another embodiment, the network 190 may be an IEEE (Institute of Electrical and Electronics Engineers) 802.11B wireless network. In still another embodiment, the network 190 may be any suitable network or combination of networks. Although one network 190 is shown, in other embodiments any number of networks (of the same or different types) may be present. The network 191 may be analogous to the network 190.

The radio stations 195 may be any radio station or combinations of radio station capable of broadcasting audio over network 190. The audio portal 196 may be any provider of audio content. For example, the audio portal 196 may be public or available on a subscription basis. In an embodiment, the audio portal 196 may be an Internet music portal.

In an embodiment, the audio portal 196 may use a streaming technology, such as RealPlayer, ShoutCast, Windows Media Server, or MusicMatch Radio, although in other embodiments any technology may be used. In an embodiment, the audio portal 196 may be active continually and users may connected midstream, but in other embodiments, the audio portal may only be active at certain times.

As will be described in detail below, aspects of an embodiment pertain to specific apparatus and method elements implementable on an electronic device. In another embodiment, the invention may be implemented as a program product for use with an electronic device. The programs defining the functions of this embodiment may be delivered to an electronic device via a variety of signal-bearing media, which include, but are not limited to:

(1) information permanently stored on a non-rewriteable storage medium, e.g., a read-only memory device attached to or within an electronic device, such as a CD-ROM readable by a CD-ROM drive;

(2) alterable information stored on a rewriteable storage medium, e.g., a hard disk drive or diskette; or (3) information conveyed to an electronic device by a communications medium, such as through a computer or a telephone network, including wireless communications.

Such signal-bearing media, when carrying machine-readable instructions that direct the functions of the present invention, represent embodiments of the present invention.

Figure 2:
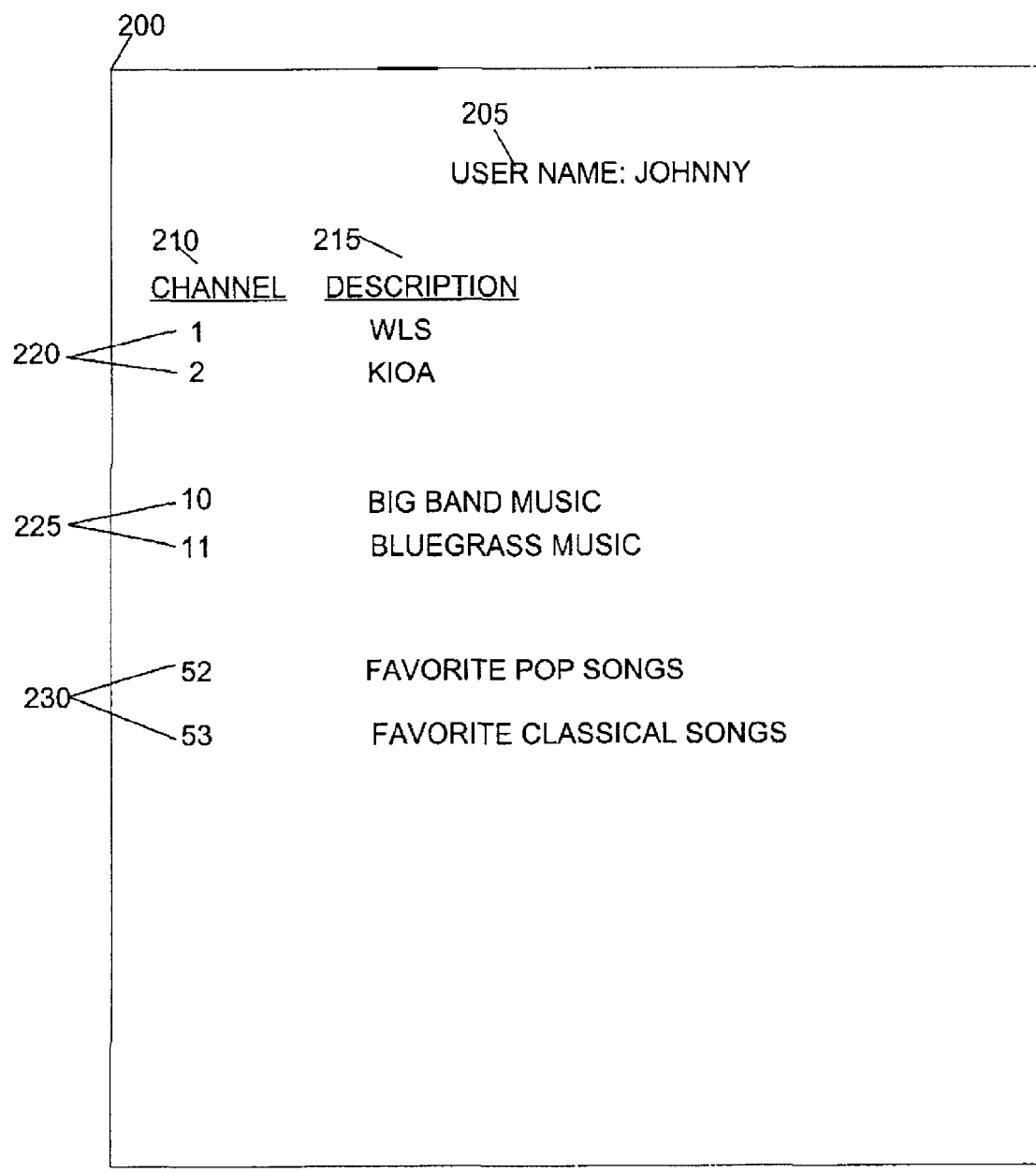
FIG. 2 depicts a pictorial representation of an example user interface, according to an embodiment of the invention.

FIG. 2 depicts a pictorial representation of an example user interface 200, which may be displayed on any or all of the output devices 137-1, 137-2, and/or 137-3, according to an embodiment of the invention. The user interface 200 may include channels 210 that user identified by the user name 205 may desire to play and an associated description 215. The user may select one of the channels 210 to play audio on the playback device 120-1, 120-2, or 120-3 via the respective input device 138-1, 138-2, or 138-3. Although channel 1, channel 2, channel 10, channel 11, channel 52, and channel 53 are shown, any appropriate channel identifiers may be used, and any number of channels may be present. Channels 220 may be user-selected radio stations from radio stations 195, channels 225 may be predefined channels from audio portal 196, and channels 230 may be playlists from audio files 175. Although each of channels 220, 225, and 230 are shown to include two channels each, any number may be present. The text shown under description 215 is for illustrative purposes only and any appropriate text may be present.

The user name 205 identifies the user associated with the attribute data displayed in the user interface 200. In this example, the user name 205 is "Johnny," but any appropriate user name may be used.

Figure 3:
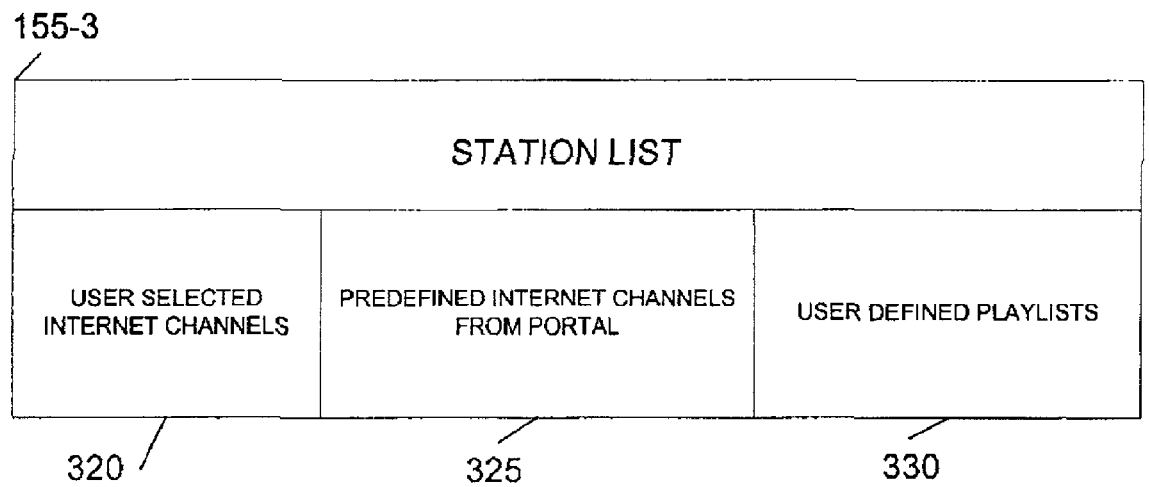
FIG. 3 depicts a pictorial representation of an example station list, according to an embodiment of the invention.

FIG. 3 depicts a block diagram of station list 155-3, which may include attributes of sources of audio data, such as user-selected internet channels 320, predefined internet channels from portal 325, and user-defined playlists 330. The user-selected internet channels 320 may be channels that the user has selected, including the address of the source of the audio and descriptions of the channels. The predefined internet channels from portal 325 may be channels that the audio portal 196 has defined, including the address of the source of the audio and descriptions of the channels. The playlists 330 may be a named list of audio files, including the address of the source or sources of the audio files and descriptions of the channels.

In an embodiment, user-selected internet channels 320 corresponds to channels 220, predefined internet channels from portal 325 corresponds to channels 225, and user-defined playlists 330 corresponds to channels 230.

Figure 4:
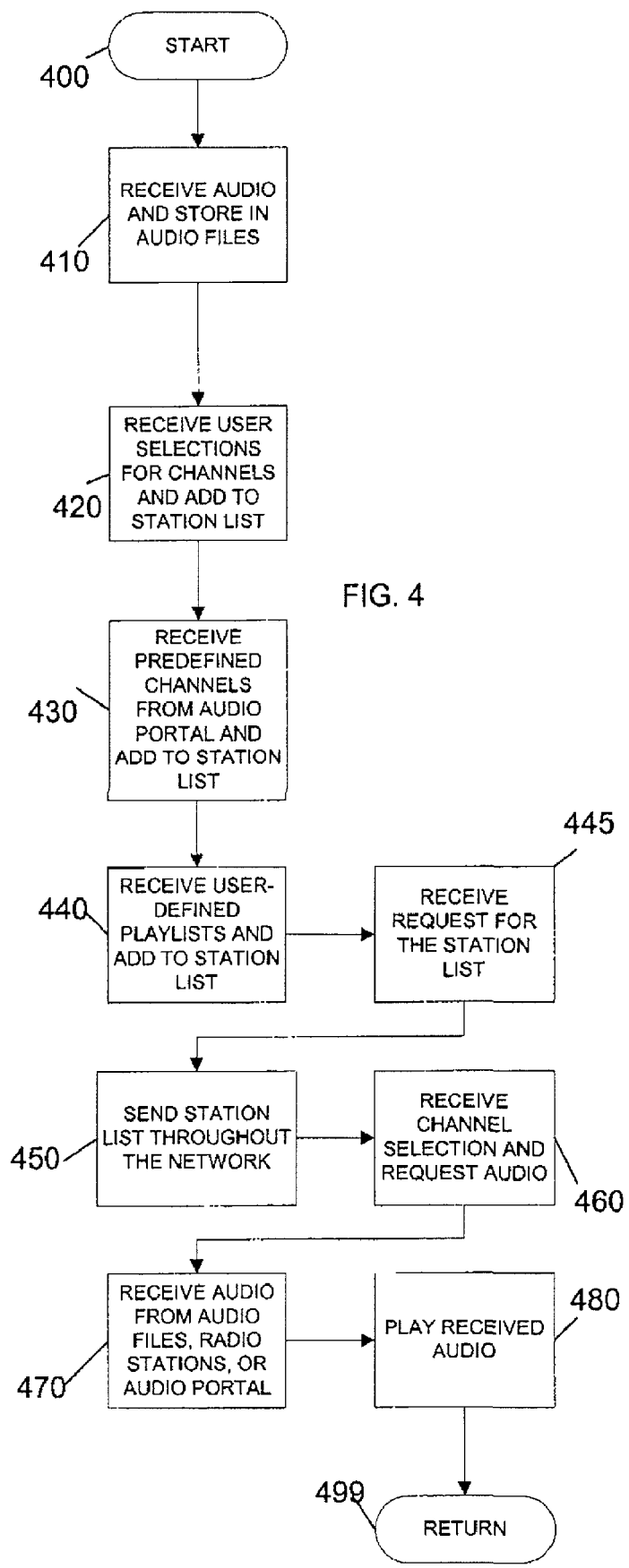
FIG. 4 depicts a flowchart of example processing, according to an embodiment of the invention.

FIG. 4 depicts a flowchart of example processing, according to an embodiment of the invention. Although the processing for FIG. 4 will be described in terms of the agent 140-3 operating at the computer 110, in other embodiments, the processing may be performed by the agent 140-1 operating at the audio network interface card 115-1 or the agent 140-2 operating at the audio network interface card 115-2. Control begins at block 400. Control then continues to block 410 where the agent 140-3 may receive audio across network 190 and store it in audio files 175. In another embodiment, the audio may be not be stored in computer 110.

Control then continues to block 420 where the agent 140-3 may receive user selections for channels via input device 138-3 and add them to user-selected internet channels 320 in station list 155-3.

Control then continues to block 430 where the agent 140-3 may receive predefined channels from the audio portal 196 and add them to the predefined internet channels from portal 325 in station list 155-3.

Control then continues to block 440 where the agent 140-3 receives user-defined playlists via input device 138-3 and adds them to the user-defined playlists 330 in the station list 155-3.

Control then continues to block 445 where the agent 140-3 may receive a request for the station list 155-3 from another agent (140-1 or 140-2) that is connected to the network 191. A user may request channels from any input device in the network regardless of where the channels in the station list were defined.

Control then continues to block 450 where the agent 140-3 sends the station list 155-3 to the agent 140-1 and 140-2 when requested by the respective agent. In another embodiment, agents 140-1 and/or agents 140-2 may send their respective station lists 1551 and 155-2 to other agents connected to the network 191.

Control then continues to block 460 where one of agents 140-1, 140-2, or 140-3 receives a channel selection via their respective input devices 138-1, 138-2, or 138-3 and requests the audio associated with the channel selection from the appropriate source associated with the selected channel, which may be the audio files 175, the radio stations 195, or the audio portal 196.

Control then continues to block 470 where the agent 140-3 receives the requested audio from audio files 175, the radio station 195, or the audio portal 196 (depending on the selected channel) and sends the audio to the appropriate playback device 120-1, 120-2, or 120-3.

Control then continues to block 480 where the appropriate playback device 120-1, 120-2, or 120-3 plays the received audio.

Control then continues to block 499 where the function returns.

In this way, a method, apparatus, and signal-bearing medium is provided that presents a station list of sources of audio in a user interface from which the user may select. The station list may include attributes of the audio, such as a channel and description. The station list may be kept on a per-user basis, so that all users may have their own list. Further, the users may access and select audio to be played from their station list anywhere in a network, regardless of where the list was created.

What is claimed is:

1. A method, comprising:
  connecting a computer of a user to a first network;
  receiving at the computer, via the first network, attribute data that describes a source of audio data, a description of the audio data, and a channel;
  incorporating the attribute data into a station list; and
  sending the station list from said computer via a second network to an agent associated with a playback device of said user;

wherein the first network is the Internet and the second network is a local network.

2. The method of claim 1, wherein the receiving further comprises:
receiving the attribute data associated with a user of said computer.

3. The method of claim 1, wherein the sending further comprises:
sending the station list to the agent after the agent requests the station list.

4. The method of claim 1, wherein the channel further comprises:
a user-selected radio station.

5. The method of claim 1, wherein the attribute data further comprises:
a user-defined playlist.

6. The method of claim 1, wherein the channel further comprises:
an audio portal channel.

7. The method of claim 1, wherein the computer includes multiple buses, a video display output device and a keyboard.

8. The method of claim 7, wherein the agent is stored on an audio network interface card.

9. The method of claim 8, wherein the agent is stored on an audio network interface card which is configured to decode a digital audio signal into an analog output.

10. The method of claim 1, wherein the audio data is digital and the playback device is associated with an audio network interface card configured to receive the audio data and send an analog output to the playback device.

11. A machine readable medium bearing instructions that, upon being executed by a processors comprise:
requesting, by a first agent stored on an audio network interface card associated with a playback device of a user, attribute data to be sent via a local network from a second agent in the network, wherein the attribute data is associated with the user of the computer and wherein the attribute data comprises a plurality of channels, a plurality of respective descriptions associated with the channels, and a plurality of respective addresses of sources associated with the channels;
incorporating the attribute data into a station list stored on the audio network interface card; and
displaying, on the audio network interface card, the plurality of channels and the plurality of respective descriptions.

12. The machine readable medium of claim 11, wherein the instructions upon being executed further comprise:
receiving a selected channel of the plurality of channels.

13. The machine readable medium of claim 12, wherein the instructions upon being executed further comprise:
requesting audio data from the source associated with the selected channel.

14. The machine readable medium of claim 13, wherein the instructions upon being executed further comprise:
playing the audio data.

15. The machine readable medium of claim 11, wherein the audio network interface card is configured to receive digital audio data and to send an analog output to the playback device.

16. A machine readable medium encoded with a data structure accessed by an agent that executes on a computer of a user, the data structure comprising:

an identifier of a channel of audio data;
a description of the channel; and
an address of a source of the audio data, wherein the agent is to create the data structure and send the data structure to an audio network interface card associated with a playback device of a user connected to the computer via a local network;
wherein the source of the audio data comprises a radio station connected to the computer via the Internet; and
wherein the audio data is digital and the audio network interface card is configured to send an analog output associated with the audio data to a playback device.

17. The machine readable medium of claim 16, wherein the source of the audio data comprises an audio file stored in the computer.

18. The machine readable medium of claim 16, wherein the source of the audio data comprises an audio portal connected to the computer via another network.

19. The machine readable medium of claim 16, wherein the agent is to associate the data structure with a user of the computer.

20. A system comprising:
a computer of a user comprising an agent to create a station list comprising channels of audio data, wherein the station list is associated with a user of the computer, and said agent is associated with a playback device of the user; and
an audio network interface card connected to the computer via a local network, wherein the audio network interface card is to receive the station list, display the channels, request audio data associated with a selected channel, and send the audio data to a playback device connected to the audio network interface card;
wherein the audio data is digital and the audio network interface card is configured to send an analog output associated with the audio data to the playback device.

21. The system of claim 20, wherein the computer further comprises a digital audio file that is a source of the audio data.

22. The system of claim 20, wherein the network is a first network, and wherein the computer is to receive the audio data from a second network and transmit the audio data via the first network to the audio network interface card.

23. The system of claim 20, wherein the agent is further to create the station list from attributes supplied by an audio portal connected to the computer via another network.

24. The system of claim 20, wherein the agent of the computer is a first agent and the audio network interface card comprises a second agent.

25. The system of claim 20, wherein the computer comprises an input device configured to receive input data from a user for the computer, the input devices being selected from a group consisting of a keyboard, a mouse, a touchscreen, a keypad, and a voice recognition device.

26. The system of claim 25, wherein the input device is a first input device, and wherein the audio network interface card comprises a second input device being configured to receive input data from the user for the audio network interface card.

* * * * *